US008191442B2

(12) United States Patent
Ko et al.

(10) Patent No.: US 8,191,442 B2
(45) Date of Patent: Jun. 5, 2012

(54) WINDOW LIFT SYSTEM AND ACTUATOR INCLUDING AN INTERNAL DRIVE TRAIN DISCONNECT

(75) Inventors: Knight Ko, Quincy, MA (US); Eric Tsui, Randolph, MA (US); Brian Ganter, Foxborough, MA (US); William Farmer, Acton, MA (US)

(73) Assignee: Stoneridge Control Devices, Inc., Canton, MA (US)

( * ) Notice: Subject to any disclaimer, the term of this patent is extended or adjusted under 35 U.S.C. 154(b) by 811 days.

(21) Appl. No.: 10/901,454

(22) Filed: Jul. 28, 2004

(65) Prior Publication Data

US 2005/0050976 A1 Mar. 10, 2005

Related U.S. Application Data

(63) Continuation-in-part of application No. 10/384,181, filed on Mar. 7, 2003, now Pat. No. 7,213,482, which is a continuation-in-part of application No. 09/836,033, filed on Apr. 17, 2001, now Pat. No. 6,557,688.

(60) Provisional application No. 60/362,854, filed on Mar. 7, 2002, provisional application No. 60/490,707, filed on Jul. 28, 2003.

(51) Int. Cl.
*F16D 41/07* (2006.01)

(52) U.S. Cl. ........................ 74/411.5; 74/425; 192/223.1

(58) Field of Classification Search ................. 74/411.5, 74/425; 192/223, 223.1, 223.2
See application file for complete search history.

(56) References Cited

U.S. PATENT DOCUMENTS

| | | | | | |
|---|---|---|---|---|---|
| 657,244 | A | | 9/1900 | Liggett | |
| 945,909 | A | * | 1/1910 | Chapman | 192/223.3 |
| 1,572,265 | A | * | 2/1926 | Bostwick et al. | 192/223.3 |
| 1,572,635 | A | * | 2/1926 | Bostwick | 192/223.3 |
| 1,858,065 | A | | 5/1932 | Verderber | |
| 1,858,066 | A | | 5/1932 | Verderber | |
| 2,094,163 | A | * | 9/1937 | Weber | 74/481 |
| 2,209,122 | A | | 7/1940 | Houplain | |
| 2,812,044 | A | | 11/1957 | Cole, Jr. | |
| 3,585,817 | A | | 6/1971 | McCafferty, Jr. | 64/30 C |

(Continued)

FOREIGN PATENT DOCUMENTS

JP 58131432 A 5/1983

OTHER PUBLICATIONS

International Search Report with Written Opinion dated Jan. 19, 2007 received in corresponding International Patent Application Serial No. PCT/US04/24216 (9 pages).

*Primary Examiner* — William C Joyce

(74) *Attorney, Agent, or Firm* — Grossman, Tucker, Perreault & Pfleger, PLLC

(57) ABSTRACT

An electro-mechanical actuator is provided resisting back driving of a gear train in at least one direction. The actuator includes an internal gear train. A clutch is coupled to an output of the gear train and transmits a driving force from the gear train to a clutch output. When a back driving force is applied to the clutch output in at least one direction, the clutch assumes a locked configuration. When the clutch is in a locked configuration the clutch resists rotational movement of the output and back driving of the gear train.

17 Claims, 2 Drawing Sheets

U.S. PATENT DOCUMENTS

| | | | | |
|---|---|---|---|---|
| 3,616,883 | A | 11/1971 | Sindelar | 192/56 R |
| 3,802,222 | A | 4/1974 | Weber | 64/30 E |
| 3,834,252 | A | 9/1974 | Abell et al. | 81/52.4 R |
| 3,934,688 | A | 1/1976 | Sides et al. | 192/48.5 |
| 3,937,036 | A | 2/1976 | Sauerwein | 64/29 |
| 3,976,172 | A * | 8/1976 | F'Geppert | 192/223.1 |
| 4,159,050 | A | 6/1979 | Hopkins et al. | 192/34 |
| 4,161,242 | A | 7/1979 | Moores, Jr. et al. | 192/34 |
| 4,215,592 | A | 8/1980 | Calvert | 74/661 |
| 4,367,660 | A | 1/1983 | Becker et al. | 74/625 |
| 4,480,733 | A * | 11/1984 | Grimm et al. | 192/223.3 |
| 4,503,370 | A | 3/1985 | Cuneo | 318/331 |
| 4,608,820 | A | 9/1986 | White et al. | 60/39.281 |
| 4,643,040 | A | 2/1987 | Adam et al. | 74/425 |
| 4,646,888 | A * | 3/1987 | Higuchi et al. | 192/223.4 |
| 4,710,071 | A | 12/1987 | Koehler et al. | 408/133 |
| 4,819,493 | A | 4/1989 | Dornan | 74/89.17 |
| 4,842,109 | A * | 6/1989 | Avny | 192/223.1 |
| 4,851,729 | A | 7/1989 | Baines | 310/239 |
| 4,903,535 | A | 2/1990 | Kikuta et al. | 74/89.1 |
| 4,908,988 | A | 3/1990 | Yamamura et al. | 49/358 |
| 5,024,022 | A | 6/1991 | Ito | 49/139 |
| 5,027,670 | A | 7/1991 | Adam | 74/425 |
| 5,086,900 | A | 2/1992 | Kikuta et al. | 192/142 R |
| 5,095,766 | A | 3/1992 | Knappe | 74/89.22 |
| 5,184,039 | A | 2/1993 | Kraft | 310/89 |
| 5,240,216 | A | 8/1993 | Lin et al. | 248/300 |
| 5,328,007 | A * | 7/1994 | Yokozuka et al. | 192/223.4 |
| 5,404,060 | A | 4/1995 | Nakahashi et al. | 310/83 |
| 5,404,975 | A | 4/1995 | Michel | |
| 5,410,229 | A | 4/1995 | Sebastian et al. | 318/434 |
| 5,449,043 | A | 9/1995 | Bourner et al. | 173/178 |
| 5,531,498 | A | 7/1996 | Kowall | 296/146.4 |
| 5,538,089 | A | 7/1996 | Sanford | 173/2 |
| 5,628,374 | A | 5/1997 | Dibbern, Jr. | 173/48 |
| 5,704,433 | A | 1/1998 | Bourner et al. | 173/48 |
| 5,738,177 | A | 4/1998 | Schell et al. | 173/178 |
| 5,787,644 | A | 8/1998 | Thomsen, Jr. | 49/351 |
| 5,855,130 | A | 1/1999 | Rorabacher et al. | 70/277 |
| 6,026,611 | A | 2/2000 | Ralston et al. | 49/123 |
| 6,041,549 | A | 3/2000 | Schust et al. | 49/375 |
| 6,043,616 | A | 3/2000 | Redelberger | 318/9 |
| 6,575,277 | B1 | 6/2003 | Torii et al. | |
| 6,655,089 | B2 * | 12/2003 | Le Gallo | 49/352 |
| 6,789,443 | B1 * | 9/2004 | Torii et al. | 74/425 |
| 2003/0000796 | A1 | 1/2003 | Kawai et al. | |

* cited by examiner

WINDOW LIFT SYSTEM AND ACTUATOR INCLUDING AN INTERNAL DRIVE TRAIN DISCONNECT

CROSS-REFERENCE TO RELATED APPLICATIONS

The present application is a continuation-in-part of U.S. patent application Ser. No. 10/384,181, filed Mar. 7, 2003 now U.S. Pat. No. 7,213,482, which is a continuation-in-part of patent application Ser. No. 09/836,033, filed Apr. 17, 2001, now U.S. Pat. No. 6,557,688, and which claims the benefit of U.S. provisional application Ser. No. 60/362,854, filed on Mar. 7, 2002. The present application also claims the benefit of U.S. provisional patent application Ser. No. 60/490,707, filed on Jul. 28, 2003. The entire disclosures of all of the above-identified applications are incorporated herein by reference.

TECHNICAL FIELD

The present invention relates generally to electro-mechanical actuators, and more specifically to an actuator that resists back driving of an internal drive train.

BACKGROUND

Known power window lift actuators may be configured with a single stage, single start worm and helical gear to affect window glass movement. These actuators may be designed with a low efficiency worm in conjunction with a large motor. The gear train may provide sufficient mechanical advantage to drive the window glass.

It is beneficial for the same gear train to provide an anti-back drive function to resist forced entry in to the vehicle. Balancing the back-drive may be a crucial element in the design. Hence the actuator may not be designed according to the maximum efficiency of the system. A large motor may be used to overcome the system inefficiency as well as to provide power to drive the window lift actuator. As a result, current draw for each actuator may be very high.

Furthermore, since the gear train has to withstand forced entry, the gear teeth should be designed to withstand such loading requirement. The gear teeth are also constantly being loaded against the window seal when window is closed in the non-operating state. The gear train, therefore, is highly susceptible to creeping, which could affect the life and performance of the window lift actuator.

There is, therefore, a need for a window lift actuator configuration that provides appropriate back-drive resistance in a reliable and cost-effective manner.

BRIEF DESCRIPTION OF THE DRAWING

For a better understanding of the present invention, together with other objects, features and advantages, reference should be made to the following detailed description which should be read in conjunction with the following figures, wherein.

DETAILED DESCRIPTION

An electro-mechanical actuator consistent with the present invention will now be described in connection with exemplary embodiments thereof. It is to be understood that the illustrated embodiment is provided by way of explanation, not of limitation. In general, the actuator may include an internal drive train having a high efficiency gear train, allowing improved system efficiency. The actuator may also include a clutch coupled to at least one driven gear of the gear train. The clutch, e.g., when engaged, may resist back driving of the gear train in at least one direction.

An embodiment of an actuator consistent with the present invention may generally include an internal drive train coupled to an output stage through a clutch. The internal drive train may include an electric motor and a gear train including at least one gear. The output stage may include at least one gear coupled between the clutch and an output of the actuator. The clutch may be disengaged when the motor is energized, allowing the internal drive train to drive the output stage. The clutch may be engaged when the motor is not energized, preventing the internal drive train from being back driven in at least one direction.

Figures 1, 3:
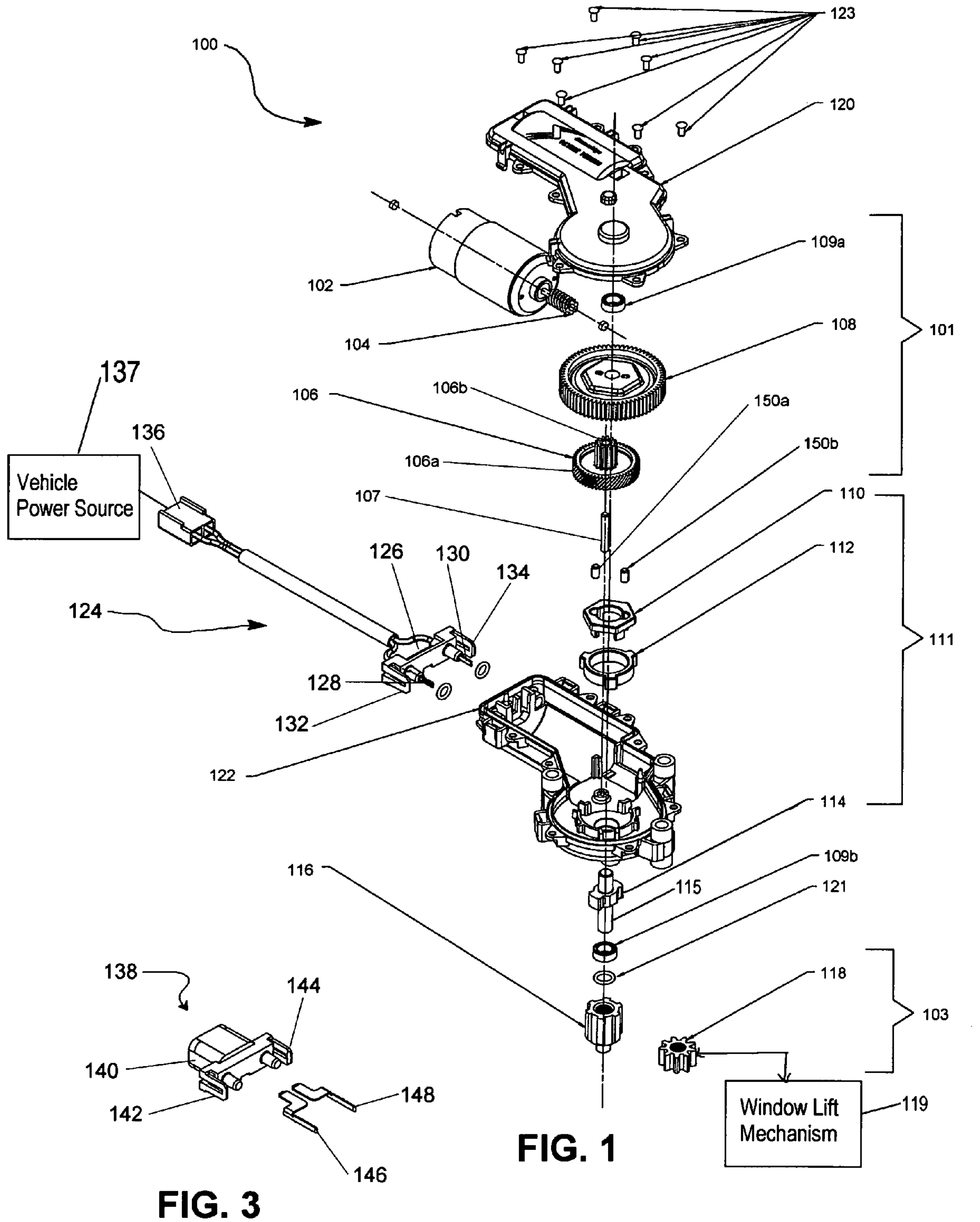
FIG. 1 is an exploded perspective view of an exemplary actuator consistent with the present invention.
FIG. 3 is and exploded perspective view of an exemplary integral electrical connector that may be used with the exemplary actuator shown in FIG. 1.

Turning to the specific exemplary embodiment illustrated in FIG. 1, the internal drive train 101 is shown including an electric motor 102 driving a worm 104. The worm 104 may be drivingly engaged with a helical portion **106*a* of a compound gear 106. The compound gear 106 may further include a pinion portion 106*b* for driving an output gear 108. The output gear 108 of the internal drive train 101 may be coupled to a clutch mechanism 111**.

The illustrated exemplary clutch mechanism 111 includes a clutch carrier 110, a clutch ring 112 and cam 114. The cam may be coupled directly to an actuator output shaft 115, as shown. The actuator output 115 shaft may be directly or indirectly provided in driving relationship, e.g. through an output stage 103 including output spline 116 or an output pinion 118, to a mechanism to be driven such as a vehicle window lift mechanism 119. The window lift mechanism may include, for example, a conventional scissor lift, a cable and pulley mechanism, etc. The present invention is not, however, limited to window lift applications. In fact, an actuator consistent with the invention may be provided to drive a wide variety of mechanisms for achieving the attendant advantages.

When the motor 102 is energized, the clutch 111 may be disengaged to allow transmission of torque from the internal drive train 101 to the output stage 103. When the motor 102 is not energized, the clutch 111 may be engaged. When the clutch is engaged, a back driving force applied to the actuator output shaft 115 is not transmitted to the internal drive train 101, in at least one direction of rotation. In one embodiment, the cam 114 may be adapted to engage the clutch ring 112 through the pins **150*a*, 150*b* when back driven in at least one direction, or in both directions. When the cam 114 is engaged with the clutch ring 112 through the pins 150*a*, 150*b*, the cam 114 may resist back driving, thereby preventing rotation of the output stage 103. Back driving force may be at least partially transferred from the clutch carrier 110 to the clutch ring 112**. The back driving force imparted to the remainder of the gear train may, accordingly, be reduced or completely eliminated.

Consistent with an exemplary embodiment, an actuator 100 consistent with the invention may also include top 120 and bottom housing portions 122, such as that shown in FIG. 1. The housing portions 120, 122 may at least partially enclose the gear train and motor 102. The housing portions 120, 122 may be joined using discrete fasteners 123, e.g. rivets, screws, etc., or by bonding the housing portions 120, 122 according to various methods known in the art.

The exemplary actuator 100 may also include an axle 107 that may carry at least a portion of the gear train. The axle 107 and/or the output shaft may be supported by bushings, e.g., 109*a*. Additionally, the exemplary actuator may also include O-rings or seals 121, and various other bushings, e.g., 109*b*.

The internal drive train 101 of an exemplary actuator 100 consistent with the present invention may include two or more stages of gears. A multi-stage gear train may increase the efficiency and decrease the friction of the gear train. In the illustrated embodiment, a first stage of the gear train may be the worm gear 104, which may be a high efficiency, multi-start worm. A high efficiency worm gear useful in connection with the present invention may have efficiency greater than or equal to 70%.

The worm gear 104 may drive a second gear train stage that may include high efficiency spur gears. High efficiency spur gears useful in connection with the present invention may have efficiency greater than or equal to 90%. In the embodiment of FIG. 1, the second stage of the gear train may include the pinion portion 106*b* of the compound helical/spur gear 106 which may drive the output gear 108. The multi-stage gear train design may exhibit reduced friction and, therefore, allow maximum efficiency. An exemplary actuator 100 utilizing a two-stage gear train design consistent with the present invention may be configured to provide an increase in efficiency in the range of a 76% relative to a gear train of a conventional actuator.

According to one aspect, a high efficiency gear train, such as the multi-stage gear train discussed above, may require less power to drive the actuator 100. Less power required to drive the actuator 100 may, in turn, allow a smaller motor to generate the necessary power output, as compared to a conventional design. The use of a smaller motor may reduce the current draw of the motor. Even if a smaller motor is not used, improved efficiency of the gear train may require less power to drive the actuator, which may also reduce the motor current draw.

An actuator gear train may experience impact loading at the end of travel, or stroke, resulting from the inertial energy of the actuator motor armature. In an exemplary embodiment of an actuator using a smaller motor, the impact loading experienced by the gear train may be reduced. A smaller motor may generally be provided having a relatively smaller armature. The smaller armature may develop less armature inertial energy during the operation of the actuator. Accordingly, at the end of stroke of the actuator there may be less armature inertial energy transferred to the gear train. The gear train may, therefore, experience reduced impact loading at the end of stroke resulting from the inertial energy of the motor armature. The reduction of impact loading at the end of travel or stroke of the actuator may allow compliant members in the gear train, such as rubber bumpers, to be eliminated from the actuator. However, such compliant members may optionally be included in an actuator consistent with the present invention.

It will be understood by those having skill in the art that a high efficiency gear train may provide reduced noise during operation. Therefore, according to another aspect, the use of a high efficiency worn design and two-stage gearing may allow audible noise to be kept to a reasonable level.

The actuator 100 may include a modular electrical connection configuration that may be customized to fit specific platform needs. Referring to the exemplary embodiment illustrated in FIG. 1, a pigtail connector assembly 124 may be employed to provide electrical connection between the actuator 100 and a vehicle power source 137. The pigtail connector assembly 124 may include an actuator connector 126 having terminals 128, 130 that may be adapted to extend through the housing portion 122 and electrically couple to the motor 102. As shown, the actuator connector 126 may include snap fit features 132, 134 adapted to secure the actuator connector 126 to the actuator housing 122. The distal end of the pigtail connector assembly may include a wire harness connector 136 adapted to provide electrical connection with a vehicle power source 137.

Referring to FIG. 3, an exemplary integral electrical connector 138 is shown. The integral connector 138 may include a receptacle housing 140 (or a plug housing), which may include snap fit features 142, 144 adapted to secure the integral connector 138 to an actuator housing 122. The integral connector 138 may include terminals 146, 148 that may be adapted to extend through a housing component 122 and electrically couple to the motor 102. Consistent with the exemplary embodiment, the receptacle housing 140 may be secured to an actuator housing 122, and thereby provide an integral actuator electrical receptacle adapted to couple to a plug connector from a vehicle power source. Those having skill in the art will appreciate that various other configuration may suitably be employed for electrically coupling the actuator 100 to a vehicle power source.

According to another aspect consistent with the invention, the performance, i.e., torque, power, speed, etc., of the actuator 100 may be customized to suit various applications. Consistent with an exemplary embodiment, the performance of the actuator 100 may be customized, or tailored, by selectively adjusting the windings of the motor 102. The motor windings may be selectively adjusted to allow a single actuator design to fulfill a wide variety of actuator performance levels, and thereby be suitable for a variety of applications, without incurring additional tooling costs. That is, actuators may be provided using the same housing, gear train, clutch assembly, etc., but may provide different torque, power, speed, etc. characteristics by only changing the windings of the motor. In some embodiments, even the same motor housing and armature may be used in actuators having different performance characteristics.

The clutch mechanism 111 of the exemplary actuator 100 may be configured to engage to provide an anti back drive feature of the actuator 100. When the clutch is engaged, the clutch may resist back drive in at least one direction. As shown in FIG. 1, the clutch 111 may be disposed on the output side of at least some of the components, e.g., gears, of the actuator gear train. The clutch 111 may resist back drive, and absorb or mitigate a back drive force before it is transferred to the gear train components on the input side of the clutch 111. In the exemplary embodiment of FIG. 1, the clutch 111 is disposed in the gear train between the output gear 108 and output shaft 115. The illustrated exemplary clutch 111 is shown directly coupled to the output gear 108 via clutch carrier 110. Those having skill in the art will appreciate that various other methods of coupling the clutch and gear train may be employed.

Providing a clutch 111 that may engage to provide anti-back drive on the output side of at least some of the components of the gear train may reduce, or even eliminate, a constant stress on the gear train when the actuator is required to maintain a loaded configuration. For example, in an exemplary application in which the actuator 100 used as a power window actuator, the actuator 100 may be required to maintain a window in a closed position when the motor 102 is not energized. A back driving force, for example generated by the weight of the window or the compression of the window against weather stripping, may be transferred to the actuator 100. The back driving force may be absorbed or diminished by the clutch 111, thereby reducing or eliminating force transferred to gear train components on the upstream side of the clutch 111. As a result, the gear train may be less susceptible to creeping under a constant or prolonged back driving force.

Furthermore, according to the exemplary actuator 100, because back driving force may be absorbed or diminished prior to reaching the gear train, the maximum loading experienced by the gear train may only be the stall force of the motor 102, rather than any applied back driving force. This may be especially beneficial because back driving forces experienced by an actuator may exceed the stall force of the motor 102. This reduction in maximum loading of the gear train may enable the use of a wide variety of materials for the gears and gear train components, including the use of plastic materials.

Another aspect of the clutch configuration consistent with the present invention 100 may be a reduction in the output lash of the actuator 100. As discussed above, the clutch 111 may be disposed on the output side of the gear train. Input forces, i.e., back driving forces, may be resisted by the clutch 111 and not transmitted to the internal drive train 101. Therefore, the internal drive train 101 lash may not be critical. The corollary of this may be that the backlash of the actuator may only be a function of the clutch 111 and of the output stage 103, not of the internal drive train 101. This may allow the overall lash of the actuator output to be more easily reduced or controlled by controlling the backlash of the clutch 111, rather than controlling the back lash of each component in the internal drive train 101. In the example of a power window actuator, this may allow movement of the window glass to be minimized in response to an external force applied to lower the window.

The various preceding aspects may allow an actuator consistent with the present invention to realize a weight reduction as compared to conventional actuators. According to some exemplary embodiments, a weight reduction of about 25% compared to conventional actuators may be achieved. As described above, providing an actuator having an anti-back drive clutch system disposed on an output side of at least a portion of the gear train may allow a portion of the gear train to be formed from plastic components, providing a corresponding reduction in weight. Additionally, the use of a smaller motor may not only reduce the weight as compared to a conventional motor, but may also reduce the overall package size of the actuator, providing an attendant reduction is the size and weight of the housing. Furthermore, consistent with the present invention, the housing may be made partially, or entirely, from plastic material, thereby also allowing a further reduction in the weight of the actuator.

According to another aspect, a clutch may be provided that may be disengaged when an input torque is applied, e.g., when a drive motor is energized, and may be engaged when no input torque is applied, e.g., when a drive motor is not energized. When the clutch is engaged it may resist being back driven in at least one direction. Optionally, the clutch may resist back driving in both directions. Consistent with the present invention, the clutch may resist a back driving force to prevent transmitting a back driving force to upstream drive train components. Additionally, the clutch may also resist rotation of the clutch output under a back driving force, and may also, thereby, resist rotation of an actuator output under a back driving force.

One exemplary clutch consistent with the present invention may generally include an input member, an output member, and a locking ring. Rotational force applied to the input member of the clutch, i.e., driving force, may place the clutch in a disengaged condition. The rotational force applied to the input member of the clutch may be transmitted to the output member of the clutch. However, in at least one direction, rotational force applied to the output member of the clutch, i.e., back driving force, may place the clutch in an engaged condition. When the clutch is in an engaged condition, the output member of the clutch may engage the locking ring. When the output member is engaged with the locking ring, the back driving force applied to the output member of the clutch may be at least partially transferred to the locking ring rather than to the input member of the clutch.

In another embodiment, the output member of the clutch may be coupled to an intermediate element disposed between the input member and output member of the clutch. According to one such embodiment, a back driving force applied to the output member of the clutch may be transmitted to the intermediate element. When the back driving force is transmitted to the intermediate element, the intermediate element may engage the locking ring, and thereby resist being back driven.

In still another embodiment, the input member of the clutch may be configured to engage the locking ring. Accordingly, when a back driving force is applied to the input member of the clutch, the input member may engage the locking ring, thereby resisting being back driven and resisting transmitting the back driving force to elements that may be coupled to the input member of the clutch.

In yet another embodiment, the clutch may be placed in an engaged condition when the driving force is not applied. According to such an embodiment, when a driving force is not applied to the clutch input member, at least one of the clutch input member, the clutch output member, or an intermediate element of the clutch may engage the locking ring. The clutch may, therefore, be placed in an engaged or locked condition even absent the application of a back driving force. When the clutch is in the engaged condition the clutch may resist back driving in at least one direction.

Figure 2:
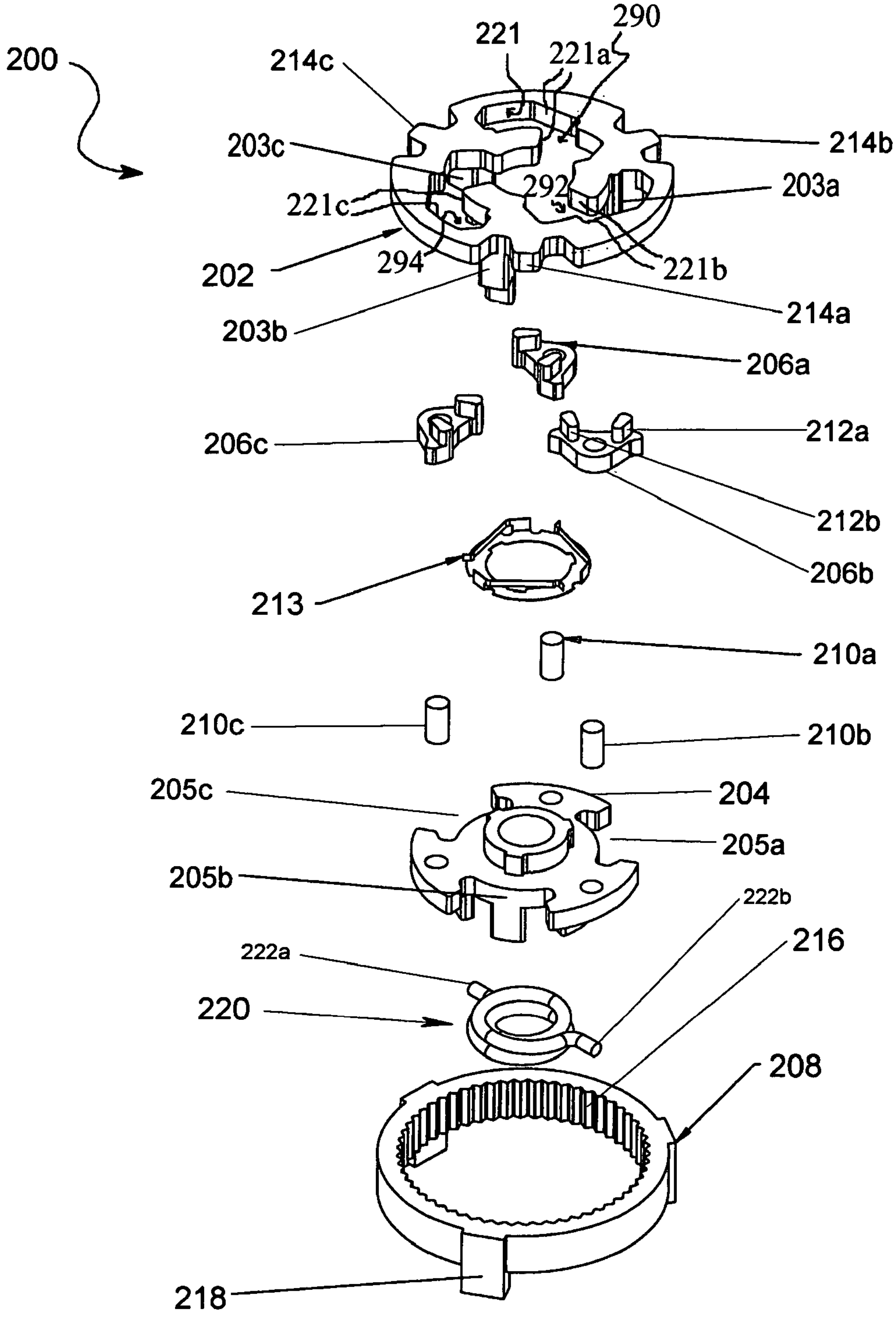
FIG. 2 is an exploded perspective view of an exemplary drive train disconnect consistent with the invention.

Referring to FIG. 2, one exemplary embodiment of clutch mechanism 200 consistent with the present invention is illustrated. The illustrated clutch mechanism 200 may be suitable for use in place of the clutch 111 shown in FIG. 1. The illustrated clutch 200 may not only provide anti-back drive, but may also provide positive engagement of a locking mechanism. As shown, the exemplary clutch 200 may generally include an input member 202 coupled to an input, such as an actuator gear train. For example, the input member 202 may have fingers 214*a-c* having a shape adapted to mate with associated slots in the output gear 108 to couple the output gear 108 to the input member 202 so that force applied by the output gear 108 may be applied to the input member 102. In turn, the input member 202 may transmit torque to an output member 204 via a plurality of downwardly extending legs 203*a-c* that may engage corresponding recesses 205*a-c* in the output member 204. The output member 204 may be coupled to an output of the clutch, such as an actuator output shaft. The output member 204 may be press-fit, splined, etc. onto the output shaft.

A plurality of pawls 206*a-c* may be pivotally disposed on the output member 204 by pins 210*a-c* received thereon. The pins 210*a-c* may be press fit into the output member 204. A cantilever spring 213 may be disposed on top of the output member 204. The pawls 206*a-c* may be disposed on top of the cantilever spring 213 with the cantilever spring acting on one side of the pawls 206*a-c*. Each of the pawls 206*a-c* may include a pair of protruding ears 212*a-b* extending from opposed sides of a top surface thereof. When the motor is energized, the cam surface 221 defining an opening in the input member 202 may engage the pawls 206*a-c* at either of its ears 212*a* or 212*b* depending on the direction of rotation to disengage the clutch from a locked position. The input member 202 may then engage the output member 204 via the extending legs 203*a-c* to drive a mechanism, e.g., a vehicle window lift mechanism that drives a window up and down. The cam surface 221 may further have a first portion 221*a* to define a first inlet 290 to accept the ears 212*a* and 212*b* of the first pawl 206*a*, a second portion 221*b* to define a second inlet 292 to accept the ears 212*a* and 212*b* of the second pawl 206*b*, and a third portion 221*c* to define a third inlet 294 to accept the ears 212*a* and 212*b* of the third pawl 206*c*.

A torsion spring 220 may be disposed on the output side of the output member 204. As shown, the ends 222*a-b* of the torsion spring 220 may extend outwardly from the torsion spring 220. At least one of the ends 222*a-b* of the torsion spring 220 may at least partially extend into at least one of the recesses 205*a-c* in the output member 204. The torsion spring 220 may return the input member 202 to a neutral position after driving its mechanism, e.g., after driving a window upward. The rest of the gear train may be designed to be back driven slightly to relieve the gears of the gear train from any residual force acting upon gear teeth when the motor is not energized. In this instance, the pawls 206*a-c* may be free from their trapped position to engage the toothed interior surface 216 of the locking ring 208.

The locking ring 208 may include the toothed interior surface 216. The pawls 206*a-c* may be configured to be engageable with the toothed inside diameter 216 of the locking ring 208 to provide an anti-back drive function of the clutch 200. Consistent with the illustrated exemplary clutch 200, the locking ring 208 may include exterior features 218 that may permit the locking ring to be non-rotatably coupled to, for example, an actuator housing.

When the input member 202 is driven in a counterclockwise direction, looking down on the top of the input member 202 in FIG. 2, the inner cam surface 221, of the input member 202 may engage the pawls 206*a-c* on the outside of the ears 212*a-b* causing the pawls 206*a-c* to rotate in a counterclockwise direction about the pins 210*a-c*. When the pawls 206*a-c* rotate about the pins 210*a-c*, the pawls 206*a-c* may disengage from the inside toothed interior surface 216 of the locking ring 208. When the pawls 206*a-c* are disengaged from the locking ring, the clutch 200 may be in an unlocked, or disengaged, configuration.

When the pawls 206*a-c* are disengaged from the locking ring 208, the input member 202 may rotate in a counterclockwise direction. As the input member 202 rotates in a counterclockwise direction the downwardly extending legs 203*a-c* of the input member 202 may engage the recesses 205*a-c* in the output member 204. The engagement of the legs 203*a-c* of the input member 202 in the recesses 205*a-c* of the output member 204 may allow the output member 204 to be driven in a counterclockwise direction by the input member 202. The output member 204 may, in turn, drive an actuator output.

When the clutch 200 is back driven, e.g., when a counterclockwise driving force relative to the top of the input member 202 is applied to the output member 204, the pawls 206*a-c* coupled to the output member 204 via pins 210*a-c* may rotate clockwise about a central axis of the output member 204. The relative movement of the pawls 206*a-c* to the input member 202 may cause the cam surface 221 to engage an ears 212*a-b* of each pawl 206*a-c*. This engagement may cause the pawls 206*a-c* to rotate clockwise relative to the respective pins 210*a-c*. When the pawls 206*a-c* rotate relative to the respective pins 210*a-c*, the pawls 206*a-c* may engage the toothed interior surface 216 of the locking ring 208, and thereby prevent rotation of the output member 204 relative to the locking ring 208.

When the input member 202 is driven in a clockwise direction, viewing the top side of the input member 202, one of the legs 203*a-c* may engage the torsion spring 220, and may partially load the torsion spring 220. The cam surface 221 may engage the inner surfaces of the ears 212*a-b* of each of the respective pawls 206*a-c*, and cause the pawls 206*a-c* to rotate counterclockwise about the respective pins 210*a-c*. Counterclockwise rotation of the pawls 206*a-c* about the pins 210*a-c* may cause the pawls 206*a-c* to disengage from the toothed interior surface 216 of the locking ring 208, placing the clutch 200 in an unlocked, or disengaged, configuration.

With the clutch 200 in an unlocked configuration, the legs 203*a-c* of the input member 202 may engage the recesses 205*a-c* of the output member. Clockwise driving force may be transmitted from the input member 202 to the output member through the engagement of the legs 203*a-c* and recesses 205*a-c*. Accordingly, the output member 204 may drive an output, e.g., an actuator output, coupled to the output member 204 in a clockwise direction.

When the driving force is discontinued, the at least partially loaded torsion spring 220 may act on the leg 203*a-c* of the input member 202 engaged with the torsion spring 220 and cause the input member 202 to rotate in a counterclockwise direction. As the input member 202 rotates in a counterclockwise direction, the input member 202 may back drive any upstream portions of a gear train, e.g., of an actuator. Additionally, as the input member 202 rotates counterclockwise, the cantilever spring 213 may urge the pawls 206*a-c* into engagement with the toothed inner diameter 216 of the locking ring 208. Accordingly, the clutch 200 may assume a locked configuration. In the locked configuration, the clutch 200 may resist a counterclockwise, relative to the top of the input member 202, back driving force applied to the output member 204.

Consistent with the foregoing, according to a first aspect, the exemplary clutch 200 may transfer a back driving force to the locking ring 208, rather than to the gear train disposed on the upstream side of the clutch, i.e., portions of the gear train preceding the input member 202. Transferring a back driving force to the locking ring 208 may limit the amount of stress imparted to such upstream portions of the gear train to the stall force of an electric motor driving the actuator. Reducing the stress imparted to the upstream portions of the gear train may allow the use of plastic materials for portions of the gear train. A back driving force transferred to the locking ring 208 may be absorbed, e.g., by an actuator housing, or other component that may absorb or transfer the force.

According to another aspect, consistent with the described operation of the exemplary clutch 200, the exemplary clutch 200 may be configured to provide anti-back drive in one direction only. In the exemplary clutch 200 back drive may be prevented in only a clockwise direction, relative to the top of the input member 202. Preventing back driving of an actuator, or the gear train, in one direction only may be advantageous in some applications. For example, when the actuator is employed for operating an automobile power window it may be desirable to prevent manually back driving the window from a closed position to an open position, in order to prevent unauthorized access into the automobile. In the example of an automobile power window, however, it may, be advantageous to be able to manually drive the actuator from an opened position to a closed position. For example, if the actuator fails when the window is in an opened position, it may be desirable to be able to manually close the window.

While the exemplary clutch mechanism has been described as preventing back driving the clutch in a counterclockwise direction, relative to the top of the input member 202, those having skill in the art will appreciate that the clutch may be readily adapted to prevent back driving the clutch in a clockwise direction, and permitting back driving in a counterclockwise direction. Symmetry of component design, in particular symmetry of the cantilever spring 213 and input member 202, help facilitate preventing back driving in either direction. Other components besides the cantilever spring 213 and input member 202 may be designed to be usable in both directions.

Consistent with a related embodiment, it will be appreciated by those having skill in the art that in various applications it may be desirable to prevent back driving the actuator, or gear train, both directions. Accordingly, the clutch 200 may be configured so that the pawls 206*a-c* engage the toothed inner diameter 216 of the locking ring 208 when the clutch is back driven in either direction. As with the previously described exemplary embodiment, when the pawls 206*a-c* engage the toothed inner diameter 216 of the locking ring 208 when being back driven, a back driving force may be transferred to the locking ring 208. Back driving force transferred to the gear train may, therefore, be reduced or eliminated.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A vehicle window lift system comprising:

a window lift mechanism; and an actuator coupled to said window lift mechanism for driving said mechanism to a desired position, said actuator comprising:

an internal drive train comprising a worm gear for driving an output gear, an output shaft, and a clutch comprising an output member having a plurality of pawls pivotally coupled thereto, an input member coupled to said output gear, a cantilever spring disposed on top of said output member with said plurality of pawls disposed on top of said cantilever spring, each of said plurality of pawls having at least one ear extending from a top surface thereof and into an associated opening in said input member, a torsion spring having a first end coupled to said output member and a second end configured to engage said input member and a locking ring, said clutch being configured to transmit torque from said output gear to said output shaft when a driving force is imparted to said input member to drive said mechanism to said desired position, and to resist transmission of torque from said output shaft to said output gear in at least one direction of rotation of said output shaft, wherein said torsion spring is configured to at least partially load in response to said driving force and to back drive at least a portion of said internal drive train when said driving force is discontinued, and wherein said plurality of pawls are configured to engage an interior surface of said locking ring, under urging from said cantilever spring, when a back driving force is applied from said output shaft to said output member in said at least one direction, transmitting at least a portion of said back driving force to said locking ring, said locking ring comprising a plurality of external features for non-rotatably coupling said locking ring to an actuator housing wherein at least a portion of a back driving force transmitted to said locking ring is transmitted to said housing.

2. The system according to claim 1, wherein said clutch is directly coupled to said output gear and said output shaft.

3. The system according to claim 1, wherein said clutch resists transmission of torque from said output shaft to said output gear in both directions of rotation of said output shaft.

4. The system according to claim 1, wherein said internal drive train further comprises helical gear, and said worm gear is coupled to said output gear through said helical gear.

5. The system according to claim 1, wherein said worm gear is a high efficiency worm gear having efficiency greater than or equal to 70%.

6. The system according to claim 5, wherein said output gear is a high efficiency spur gear having efficiency greater than or equal to 90%.

7. The system according to claim 5, wherein said high efficiency worm gear comprises a multi-start worm gear.

8. The system according to claim 1, wherein said actuator is at least partially disposed in a housing, and wherein said output shaft extends outward from said housing.

9. The system according to claim 1, wherein said interior surface of said locking ring is toothed.

10. An actuator comprising:

an internal drive train comprising a worm gear for driving an output gear;

an output shaft; and a clutch comprising an output member having a plurality of pawls pivotally coupled thereto, an input member coupled to said output gear, a cantilever spring disposed on top of said output member with said plurality of pawls disposed on top of said cantilever spring, each of said plurality of pawls having at least one ear extending from a top surface thereof and into an associated opening in said input member, a torsion spring having a first end coupled to said output member and a second end configured to engage said input member and a locking ring, said clutch being configured to transmit torque from said output gear to said output shaft when a driving force is imparted to said input member, and to resist transmission of torque from said output shaft to said output gear in at least one direction of rotation of said output shaft, wherein said torsion spring is configured to at least partially load in response to said driving force and to back drive at least a portion of said internal drive train when said driving force is discontinued, and wherein said plurality of pawls are configured to engage an interior surface of said locking ring, under urging from said cantilever spring, when a back driving force is applied from said output shaft to said output member in said at least one direction, transmitting at least a portion of said back driving force to said locking ring, said locking ring comprising a plurality of external features for non-rotatably coupling said locking ring to an actuator housing wherein at least a portion of a back driving force transmitted to said locking ring is transmitted to said housing.

11. The actuator according to claim 10, wherein said clutch is directly coupled to said output gear and said output shaft.

12. The actuator according to claim 10, wherein said clutch resists transmission of torque from said output shaft to said output gear in both directions of rotation of said output shaft.

13. The actuator according to claim 10, wherein said internal drive train further comprises helical gear, and said worm gear is coupled to said output gear through said helical gear.

14. The actuator according to claim 10, wherein said worm gear is a high efficiency worm gear having efficiency greater than or equal to 70%.

15. The actuator according to claim 14, wherein said output gear is a high efficiency spur gear having efficiency greater than or equal to 90%.

16. The actuator according to claim 14, wherein said high efficiency worm gear comprises a multi-start worm gear.

17. The actuator according to claim 10, wherein said interior surface of said locking ring is toothed.

* * * * *